(12) United States Patent
Valva et al.

(10) Patent No.: US 10,174,629 B1
(45) Date of Patent: Jan. 8, 2019

(54) PHONIC SEAL SEAT

(71) Applicant: United Technologies Corporation, Farmingtom, CT (US)

(72) Inventors: Christopher M. Valva, Manchester, CT (US); Todd A. Davis, Tolland, CT (US); Joseph D. Walker, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/700,922

(22) Filed: Sep. 11, 2017

(51) Int. Cl.
| | |
|---|---|
| *F01D 25/16* | (2006.01) |
| *F02C 7/06* | (2006.01) |
| *F16C 37/00* | (2006.01) |
| *F16C 33/66* | (2006.01) |
| *F01D 11/00* | (2006.01) |
| *F16J 15/34* | (2006.01) |

(52) U.S. Cl.
CPC ............ *F01D 11/003* (2013.01); *F01D 25/16* (2013.01); *F02C 7/06* (2013.01); *F16C 33/667* (2013.01); *F16C 37/00* (2013.01); *F16J 15/3404* (2013.01); *F05D 2240/50* (2013.01); *F05D 2240/55* (2013.01); *F16C 2360/23* (2013.01); *F16N 2210/12* (2013.01); *F16N 2210/14* (2013.01)

(58) Field of Classification Search
CPC .............. F16C 11/003; F16C 2360/123; F16C 33/667; F16C 2260/66; F16C 2360/23; F16C 37/00; F16J 15/3404; F16N 2210/14; F16N 2260/66; F16N 2210/12; F05D 2260/232; F05D 2240/50; F05D 2240/55; F01D 25/16; F01D 25/186; F02C 7/06
USPC ........ 384/130, 477, 481, 467; 277/306, 358, 277/408; 415/175, 229; 184/6.26, 14
See application file for complete search history.

(56) References Cited

U.S. PATENT DOCUMENTS 2,956,824 A * 10/1960 Kuchler ................ F01D 11/003
277/500
3,025,115 A * 3/1962 Shevchenko ......... F01D 11/003
184/6.26
(Continued)

FOREIGN PATENT DOCUMENTS

| CA | 2613767 A1 | 6/2008 |
|---|---|---|
| CN | 103748473 A | 4/2014 |

(Continued)

*Primary Examiner* — Marcus Charles
(74) *Attorney, Agent, or Firm* — Kinney & Lange, P.A.

(57) ABSTRACT

A sealing assembly for a bearing compartment of a gas turbine engine includes a shaft and a seal plate mounted to the shaft. The shaft is configured to rotate about a longitudinal axis of the gas turbine engine. The seal plate includes an annular body, scoop, sealing surface, plurality of teeth, and channel. The scoop is connected to and extends radially from the annular body. The scoop defines a lip and an annulus surrounding the shaft and is disposed on a first axial end of the annular body. The sealing surface is disposed on a second axial end of the annular body opposite from the scoop. The plurality of teeth are disposed into and along an outer perimeter of a portion of the annular body. The channel extends through a portion of the annular body and is fluidly connected to the scoop and to the sealing surface.

18 Claims, 3 Drawing Sheets

(56) References Cited

U.S. PATENT DOCUMENTS

| | | | |
|---|---|---|---|
| 3,915,521 A * | 10/1975 | Young | F01D 25/183 384/467 |
| 6,409,464 B1 * | 6/2002 | Fisher | F01D 25/16 384/475 |
| 8,308,426 B2 * | 11/2012 | Cigal | F01D 25/18 384/475 |
| 8,464,835 B2 * | 6/2013 | Munson | F01D 25/16 184/14 |
| 8,899,916 B2 | 12/2014 | McCune et al. | |
| 8,966,911 B2 | 3/2015 | Ress, Jr. et al. | |
| 9,052,330 B2 | 6/2015 | Jacoby et al. | |
| 9,076,272 B2 | 7/2015 | Hammerschmidt | |
| 9,140,718 B2 | 9/2015 | O'Neil et al. | |
| 9,151,771 B2 | 10/2015 | Vig et al. | |
| 9,176,162 B2 | 11/2015 | Francescon | |
| 9,267,855 B2 | 2/2016 | Ameil et al. | |
| 2007/0213917 A1 | 9/2007 | Bruno et al. | |
| 2013/0078079 A1 * | 3/2013 | LaPierre | F01D 25/16 415/110 |
| 2013/0199206 A1 | 8/2013 | Cigal et al. | |
| 2013/0283758 A1 * | 10/2013 | Wotzak | F01D 25/18 60/39.08 |
| 2014/0010648 A1 * | 1/2014 | Muldoon | F01D 25/16 415/230 |
| 2014/0130618 A1 | 5/2014 | Klinglmair et al. | |
| 2014/0144155 A1 * | 5/2014 | Down | F01D 9/042 60/782 |
| 2014/0244051 A1 | 8/2014 | Rollins et al. | |
| 2014/0265740 A1 | 9/2014 | Franci | |
| 2014/0369832 A1 * | 12/2014 | Blais | F01D 11/00 415/230 |
| 2015/0211380 A1 | 7/2015 | Curlier et al. | |
| 2015/0233735 A1 | 8/2015 | Lerchenmueller et al. | |
| 2016/0003093 A1 | 1/2016 | McCune | |
| 2016/0146705 A1 | 5/2016 | Berkcan | |
| 2016/0178464 A1 | 6/2016 | Burns et al. | |
| 2016/0281527 A1 * | 9/2016 | Lucas | F01D 17/06 |
| 2016/0281537 A1 * | 9/2016 | Lucas | F01D 25/183 |
| 2016/0348792 A1 * | 12/2016 | Labbe | F01D 11/003 |
| 2017/0002686 A1 * | 1/2017 | Scothern | F01D 25/183 |
| 2017/0122230 A1 | 5/2017 | Bhattacharya et al. | |
| 2017/0152760 A1 * | 6/2017 | Tompkins | F01D 25/18 |

FOREIGN PATENT DOCUMENTS

| | | | |
|---|---|---|---|
| EP | 0802414 A2 | 10/1997 | |
| EP | 1905961 A2 * | 4/2008 | F01D 25/16 |
| EP | 2836694 A1 | 2/2015 | |
| EP | 2971675 A1 | 1/2016 | |
| EP | 2893158 B1 * | 11/2016 | F01D 21/003 |
| JP | 2013231436 A * | 11/2013 | F01D 25/18 |
| JP | 5716103 B2 | 5/2015 | |
| KR | 20160023667 A | 3/2016 | |
| WO | WO2009115113 A1 | 9/2009 | |
| WO | WO2015006433 A2 | 1/2015 | |
| WO | WO2015069998 A1 | 5/2015 | |
| WO | WO2015073084 A1 | 5/2015 | |

\* cited by examiner

PHONIC SEAL SEAT

STATEMENT OF GOVERNMENT INTEREST

This invention was made with government support under FA8650-09-D-2923-0021 awarded by the United States Air Force. The government has certain rights in the invention.

BACKGROUND

The present disclosure relates to seal assemblies. More particularly, the present disclosure relates to seal plates for gas turbine engines.

In order to determine the rotational speed of a shaft (such as a shaft of a gas turbine engine), a magnetic probe is used to sense the passing of a tooth like feature on the shaft. Generally, the piece on the shaft that has the teeth is its own stand-alone part. Portions of gas turbine engines with limited space can prevent the ability to have the toothed part mounted onto the shaft.

SUMMARY

A sealing assembly for a bearing compartment of a gas turbine engine includes a shaft and a seal plate mounted to the shaft. The shaft is configured to rotate about a longitudinal axis of the gas turbine engine. The seal plate includes an annular body, a scoop, a sealing surface, a plurality of teeth, and a channel. The scoop is connected to and extends radially from the annular body. The scoop defines a lip and an annulus surrounding the shaft and is disposed on a first axial end of the annular body. The sealing surface is disposed on a second axial end of the annular body opposite from the scoop. The plurality of teeth are disposed into and along an outer perimeter of a portion of the annular body. The channel extends through a portion of the annular body and is fluidly connected to the scoop and to the sealing surface.

A method of measuring a rate of rotation of a seal plate in a gas turbine engine includes rotating the seal plate and sensing a rate of rotation of the seal plate with a sensor. The seal plate includes an annular body, a scoop, a sealing surface, a plurality of teeth, and a channel. The scoop is connected to and extends radially from the annular body. The scoop defines a lip and an annulus and is disposed on a first axial end of the annular body. The sealing surface is disposed on a second axial end of the annular body opposite from the scoop. The plurality of teeth are disposed into and along an outer perimeter of a portion of the annular body. The channel extends through a portion of the annular body and is fluidly connected to the scoop and to the sealing surface. The sensor is mounted to a housing of the gas turbine engine.

A seal plate includes an annular body, a scoop, a sealing surface, a plurality of teeth, and a channel fluidly connected to the scoop and to the sealing surface. The scoop is connected to and extends radially from the annular body. The scoop defines a curved lip and an annulus and is disposed on a first axial end of the annular body. The sealing surface is disposed on a second axial end of the annular body opposite from the scoop. The plurality of teeth are disposed into and along an outer perimeter of a portion of the annular body. The plurality of teeth are configured to induce a current as the seal plate is rotated. The channel extends through a portion of the annular body and is fluidly connected to the scoop and to the sealing surface. The seal plate comprises a wet seal configured to form a sealing interface using a fluid. The seal plate comprises a face seal with the sealing surface oriented orthogonally to a rotational axis of the seal plate. A material of the seal plate comprises a ferromagnetic metal.

DETAILED DESCRIPTION

Figure 1:
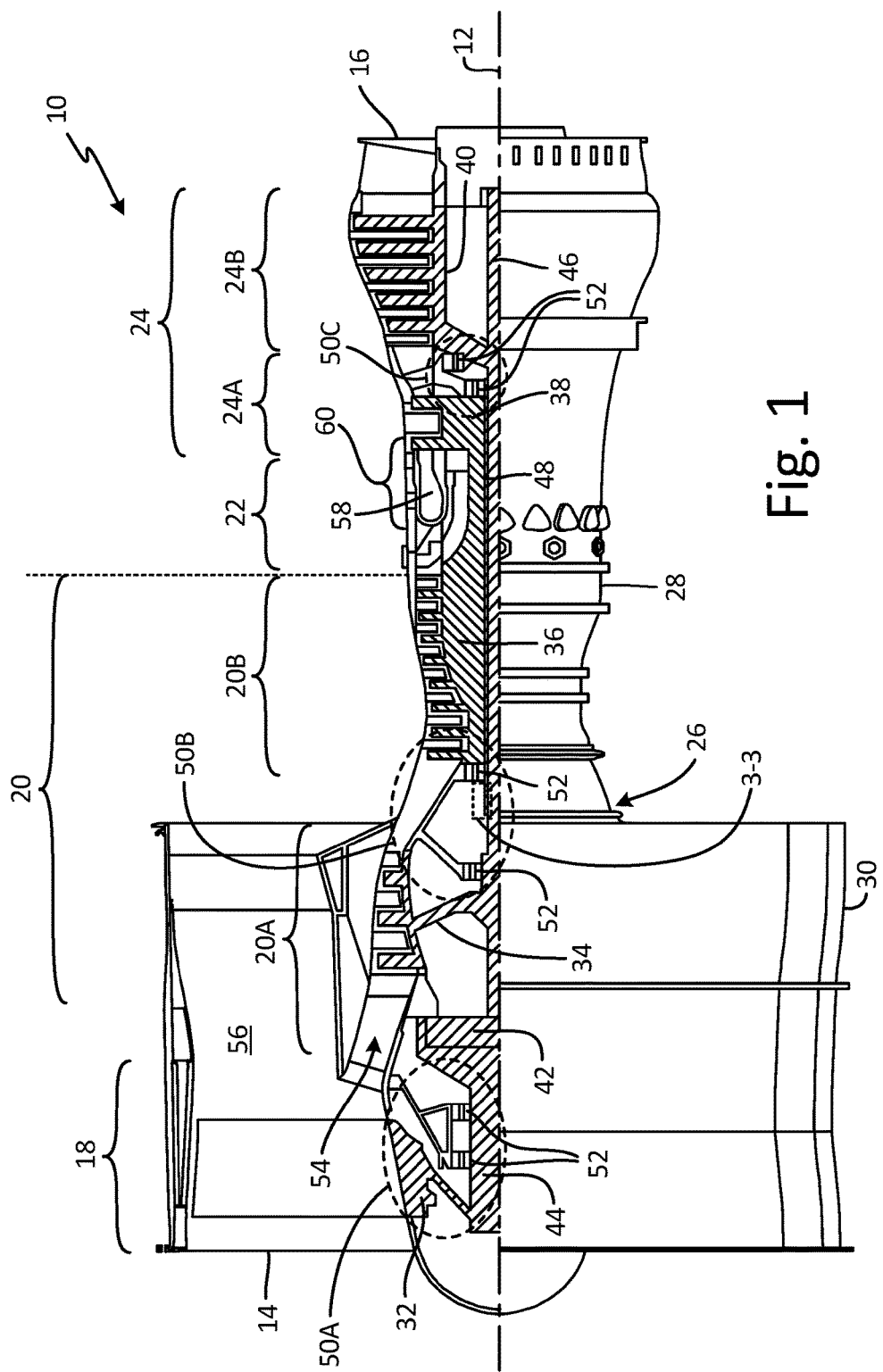
FIG. 1 is a side partial cross-section view of a gas turbine engine.

FIG. 1 shows a side partial cross-section view of engine 10 and includes axial centerline 12, upstream airflow inlet 14, downstream airflow exhaust outlet 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with core case 28 and fan case 30), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, and combustor 60.

In one non-limiting embodiment, engine 10 can be a gas turbine engine. In other non-limiting embodiments, engine 10 can include a helicopter (e.g., HPW3000), a variable cycle advanced technology, or other type of engine.

Engine 10 extends along axial centerline 12 between upstream airflow inlet 14 and downstream airflow exhaust outlet 16. Engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes core case 28 and fan case 30. Core case 28 may house one or more of fan section 18, compressor 20, combustor section 22, and turbine section 24. Fan case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between core case 28 and fan case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40, respectively drive rotation of HPC rotor 36 and LPC rotor 34 and compression of the air received from core gas path 54. The rotation of LPT rotor 40 also drives (via gear train 42) the rotation of fan rotor 32, which propels bypass air through and out of bypass gas path 56. The propulsion of the bypass air may account for a majority of thrust generated by engine 10, which can be more than 75% of engine thrust. Engine 10 of the present disclosure, however, is not limited to the foregoing exemplary thrust ratio. Engine 10 of the present disclosure can be a high-bypass turbofan, either geared (as shown) or non-geared, or a low-bypass turbofan, or a turbojet, or a turboshaft, or a turboprop. Engine 10 of the present disclosure can be a two-spool engine (as shown) or an engine with more than two spools.

Figure 2:
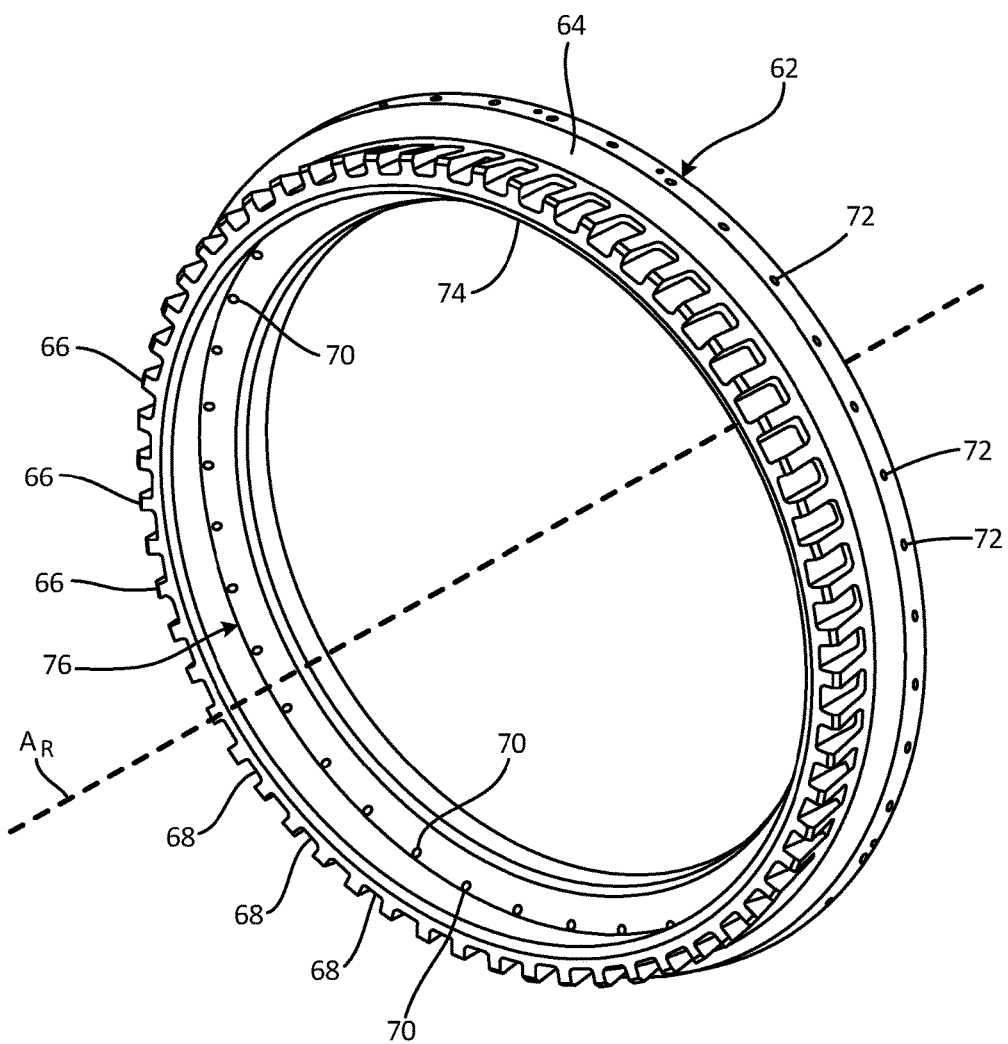
FIG. 2 is a perspective view of a seal plate of the seal assembly.

FIG. 2 is a perspective view of seal plate 62 from one of bearing compartments 50A, 50B, and 50C. FIG. 2 shows a full circumference of seal plate 62 with body 64, teeth 66, valleys 68, channels 70, radial outlets 72, scoop 74, annulus 76, and rotational axis $A_R$. Seal plate 62 is an annular seal element. In one non-limiting embodiment, seal plate 62 can include a rotating wet face seal configured to provide an oil-lubricated sealing interface. In other non-limiting embodiments, seal plate 62 can include a dry-face seal, circumferential carbon seal, liftoff seal, knife-edge seal, or an end-face seal. In one non-limiting embodiment, a material of seal plate 62 can include steel or another type of ferromagnetic metal.

Figure 3:
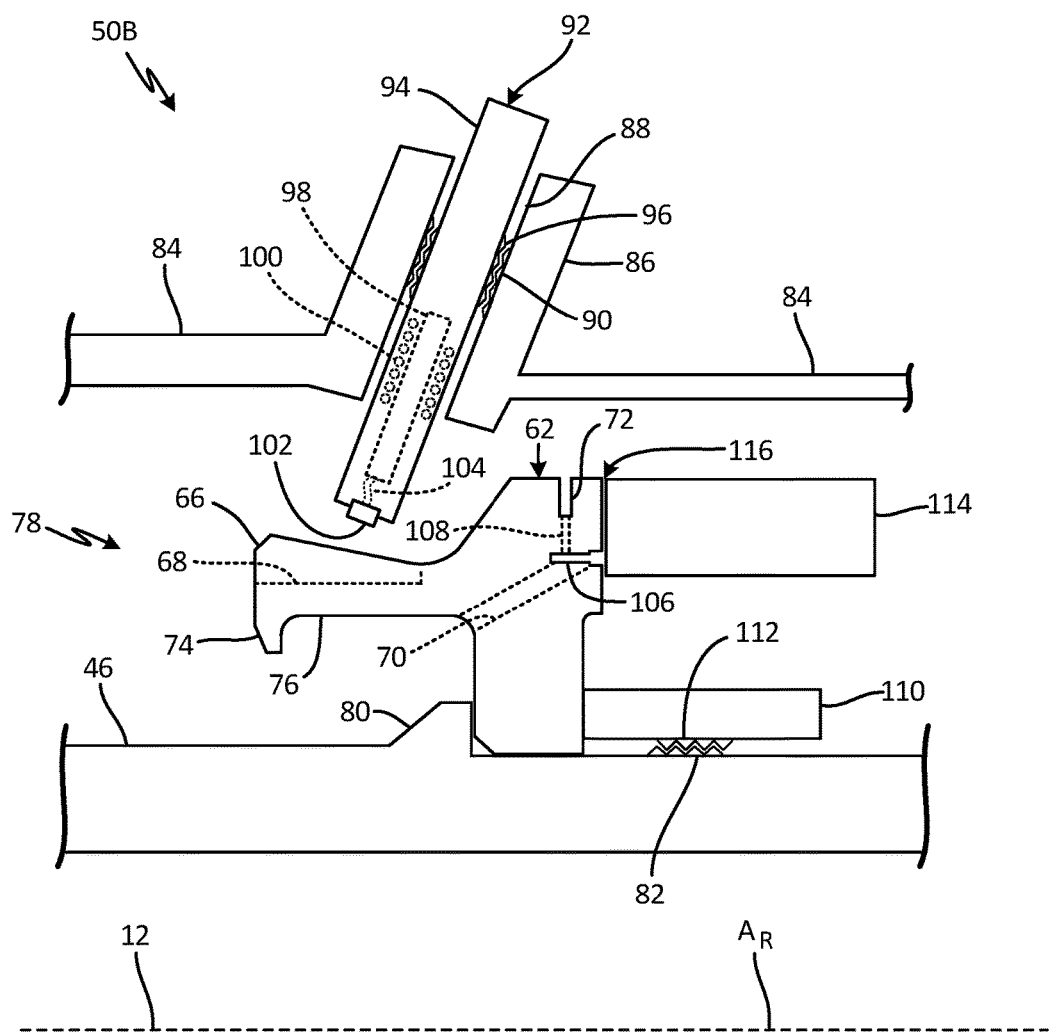
FIG. 3 is an enlarged cross-section view of a seal assembly of a bearing compartment of the gas turbine engine.

Body 64 is an annular ring of solid material. Teeth 66 are a radial extension of solid material. In one non-limiting embodiment, a material of teeth 66 can include the same material as seal plate 62. In other non-limiting embodiments, teeth 66 can include a material with a higher magnetic flux density than that of other portions of seal plate 62. As discussed herein, teeth 66 will also be referred to as tooth 66 and the two terms will be used interchangeably. (See e.g., FIG. 3 showing a partial cross-section view of seal plate 62 with a single tooth 66.) Valleys 68 include slots or channels cut out of seal plate 62.

Channels 70 are passages or conduits configured to transfer a fluid. As discussed herein, channels 70 will also be referred to as channel 70 and the two terms will be used interchangeably. (See e.g., FIG. 3 showing a partial cross-section view of seal plate 62 with a single channel 70.) Radial outlets 72 are holes or passages disposed in body 64. Scoop 74 is an annular, curved lip. Annulus 76 is a space or area formed in the shape of a circular pocket. Rotational axis $A_R$ is an axis upon which seal plate 62 rotates and that passes through a center of seal plate 62 (and that is coincident with axial centerline 12 shown in FIG. 1).

Teeth 66 are formed in, are connected to, and extend radially outward from seal plate 62. In one non-limiting embodiment, teeth 66 are integrally formed as a part of seal plate 62. In this non-limiting embodiment, seal plate 62 includes sixty of teeth 66. In other non-limiting embodiments, seal plate 62 can include more or less than sixty of teeth 66 and as few as a single tooth 66. As shown in FIG. 2, teeth 66 are disposed in seal plate 62 such that teeth 66 are uniformly spaced along a circumference of seal plate 62. In other non-limiting embodiments, teeth 66 and/or valleys 68 can be non-uniformly spaced or sized from other teeth 66 or valleys 68, respectively. Teeth 66 can include a circumferential width of 0.1 to 0.2 inches (0.25 to 0.51 centimeters), an axial length of approximately 0.5 inches (1.27 centimeters), and a radial height of approximately 0.5 inches (1.27 centimeters). In one non-limiting embodiment, teeth 66 include edges with approximately ninety degree angles.

Valleys 68 are spaces or voids disposed into portions of seal plate 62 and are positioned between consecutive teeth 66. As shown in FIG. 3, teeth 66 and valleys 68 are disposed in a uniformly alternating pattern of tooth 66, valley 68, tooth 66, valley 68, . . . etc. Valleys 68 can include an axial length of approximately 0.5 inches (1.27 centimeters), a radial height of approximately 0.5 inches (1.27 centimeters), and a circumferential width of approximately 0.25 inches (0.64 centimeters).

Channel 70 is disposed in a portion of seal plate 62 and extends from annulus 76 through seal plate 62 to an axially downstream (to the right in FIG. 2FIG. 3) end of seal plate 62. In one non-limiting embodiment, channel 70 (or channels 70) can be drilled into seal plate 62 after seal plate 62 is turned and/or after teeth 66 are machined into seal plate 62. In another non-limiting embodiment, channel 70 (or channels 70) can be drilled into seal plate 62 after seal plate 62 is turned and/or before teeth 66 are machined into seal plate 62. Radial outlets 72 extend into body 64 and are fluidly connected to channels 70. Scoop 74 extends from seal plate 62 and curves radially inward towards low speed shaft 46. Annulus 76 is formed and is circumferentially surrounded by scoop 74.

Seal plate 62 creates a wet face seal at an axially downstream end (to the right in FIG. 2) by channeling oil from annulus 76, through channels 70, and to the axially downstream end of seal plate 62. Teeth 66 and valleys 68 function by passing across or by a tip of a nearby probe thereby perturbing or altering the magnetic field of a magnet in the probe. As teeth 66 perturb the magnetic field of the magnet in the probe, a current is induced in a coil of the probe. The current induced in the coil is then received by electrical circuitry connected to the probe that processes the induced current to produce an electrical signal that indicates the rotational speed of seal plate 62.

Channel 70 provides a passage for oil collected by scoop 74 to pass from annulus 76, through a portion of seal plate 62, and to an axial end of seal plate 62. The oil transferred from annulus 76 through channel 70 (or channels 70) provides thermal regulation (e.g., cooling) of seal plate 62 as well as provides a lubricating film for seal plate 62 to ride against. Radial outlets 72 provide a fluidic outlet for oil to be released in a radial direction from seal plate 62 as well as to further provide cooling to seal plate 62. Scoop 74 catches and/or traps oil in annulus 76. The combination of scoop 74 and channel 70 provide a cooling function for seal plate 62 so that seal plate 62 does not overheat. Annulus 76 contains oil captured or trapped by scoop 74.

Previous designs of bearing compartments included stand-alone pieces with teeth which increased part count and weight within the engine compartment. As opposed to existing designs, the purpose of seal plate 62 is to provide teeth 66 on a component already within the engine compartment, removing the need for a stand-alone toothed piece in addition to seal plate 62. Seal plate 62 with teeth 66 allows for several functions required for oil sealed rotating hardware to be combined into a single, space efficient part. A sealing surface is created, lubricating oil is pumped to that sealing surface, and the speed of the engine shaft (e.g., low speed shaft 46 in this non-limiting embodiment) is measured all with a single part providing for space, weight, and part count savings.

FIG. 3 is an enlarged cross-section view taken along 3-3 of FIG. 1 showing a portion of bearing compartment 50B with seal assembly 78. FIG. 3 shows axial centerline 12, low speed shaft 46 (with shoulder 80 and threaded portion 82), cross-over housing 84 (with mount 86 including slot 88 with threaded portion 90, and probe 92 including body 94 with threaded portion 96, magnet 98, coil 100, tip 102, and wires 104), seal assembly 78 (with seal plate 62 including body 64, tooth 66, valley 68, channel 70, axial outlet 106, radial outlet 72, scoop 74, annulus 76, and channel 108), retaining element 110 with threaded portion 112, seal element 114, and sealing interface 116. Although seal assembly 78 is discussed as being disposed in bearing compartment 50B, seal assembly 78 can be disposed in any one of bearing compartments 50A, 50B, 50C, or another compartment of gas turbine engine 10. In another non-limiting embodiment, low speed shaft 46 as shown in FIG. 3 can be representative of high speed shaft 46, and/or cross-over housing 84 can be representative of high speed shaft 46 or a main shaft of gas turbine engine 10.

Shoulder 80 is a projection of solid material. Threaded portions 82, 90, 96, and 112 are helical ridges. Cross-over housing 84 is a casing of solid material. Mount 86 is a tubular element of solid material. In one non-limiting embodiment, mount 86 can include a boss. Slot 88 is an opening or channel. Probe 92 is a sensor configured to measure the speed of another object. In one non-limiting embodiment, probe 92 can include a magnetic sensor configured to sense changes in a magnetic field of probe 92. In other non-limiting embodiments, probe 92 can include an optical sensor. Body 94 is an elongated cylindrical housing. Magnet 98 is a magnet that can be one of an electromagnet, permanent magnet, or a temporary magnet. Coil 100 is a length of metal wire wound into a coil. Tip 102 is an end or head of probe 92 and is configured to measure changes in a magnetic field of probe 92 or of another object. Wires 104 are electrical wires.

Axial outlet 106 is a hole or passage disposed in body 64. In this non-limiting embodiment, a single axial outlet 106 is shown in FIG. 3, however seal plate 62 can include a plurality of axial outlets 106 disposed along the entire ring of seal plate 62, the number of which can equal a number of channels 93 and/or radial outlets 72. Channel 108 is a passage or conduit configured to transfer a fluid. In this non-limiting embodiment, a single channel 108 is shown in FIG. 3, however seal plate 62 can include a plurality of channels 93 disposed along the entire ring of seal plate 62. Retaining element 110 is a hollow, cylindrically shaped portion of solid material. Seal element 114 is a ring-shaped resilient element of solid material. In one non-limiting embodiment, seal element 114 can be generally in the shape of a ring or annulus.

Sealing interface 116 is an interface or minor gap between and an axial end of seal plate 62 and an axial end of seal element 114.

Shoulder 80 is connected to and extends radially outward from low speed shaft 46. Threaded portion 82 is connected to and extends radially outward from low speed shaft 46. Cross-over housing 84 is connected to and forms a portion of one of bearing compartments 50A, 50B, or 50C. In other non-limiting embodiments, cross-over housing 84 can form another portion of gas turbine engine 10. Mount 86 is disposed in and extends through a portion of cross-over housing 84. Slot 88 extends through a portion of cross-over housing 84 by extending longitudinally through mount 86. Threaded portion 90 is connected to and extends radially inward from slot 88 of mount 86.

Probe 92 engages with mount 86 such that probe 92 is mounted into mount 86. Threaded portion 96 is connected to and extends radially outward from body 94. Body 94 houses magnet 98 and coil 100. Body 94 is disposed within a portion of slot 88 of mount 86. Body 94 is threadably engaged with slot 88 of mount 86. Magnet 98 is disposed or mounted within a portion of body 94. Coil 100 is disposed or mounted within a portion of body 94. Tip 102 is mounted to an end of body 94 and is electrically connected to components within body 94 such as magnet 98 and coil 100. In one non-limiting embodiment, tip 102 can be positioned 0.020 to 0.050 inches (0.5 to 1.3 millimeters) away from tooth 66 of seal plate 62.

Seal plate 62 is mounted onto and extends circumferentially around low speed shaft 46. Seal plate 62 is pressed against shoulder 80 of low speed shaft 46 by retaining element 110. Seal plate 62 is configured to rotate relative to cross-over housing 84, which in this non-limiting embodiment remains stationary relative to gas turbine engine 10 during operation of gas turbine engine 10. An inner diameter of seal plate 62 is in contact with an outer diameter of low speed shaft 46. In one non-limiting embodiment, seal plate 62 is disposed on low speed shaft 46 such that the relative positioning and spacing between seal plate 62 and probe 92 allows for minor radial and/or axial displacement of seal plate 62 (i.e., from aircraft maneuvers, thermal growth/expansion/contraction, etc.) while also allowing seal plate 62 to remain at a distance from probe 92 enabling probe 92 to properly sense tooth 86. Channel 70 fluidly connects annulus 76 to axial outlet 106. Channel 108 fluidly connects axial outlet 106 to radial outlet 72.

Retaining element 110 is threadably engaged with low speed shaft 46 via threaded portion 82 of low speed shaft 46 and threaded portion 112 of retaining element 110. Seal element 114 surrounds low speed shaft 46 and is located radially between low speed shaft 46 and high speed shaft 48. Sealing interface 116 forms a minor gap between an axial end of seal plate 62 and an axial end of seal element 114. During operation of gas turbine engine 10, a film is formed at sealing interface 116.

Shoulder 80 of low speed shaft 46 functions to provide an axial stop which seal plate 62 is pressed against for axial and rotational retention. Threaded portion 82 of low speed shaft 46 functions to engage with threaded portion 95 of retaining element 110 so as to prevent relative axial movement between retaining element 110 and low speed shaft 46. Cross-over housing 84 provides a barrier between distinct compartments within gas turbine engine 10 so as to prevent a flow of fluids between the compartments where necessary. Cross-over housing 84 receives probe 92 into slot 88 of mount 86 and secures probe 92 such that probe 92 is affixed to cross-over housing 84. Slot 88 forms a receiving space for insertion of probe 92. Threaded portion 90 of slot 88 threadably engages with threaded portion 96 of probe 92.

Probe 92 is configured to measure a rotational velocity or speed of seal plate 62. In one non-limiting embodiment, probe 92 measures a rotational speed of seal plate 62 by creating a magnetic field and sensing changes in that magnetic field as teeth 66 pass by probe 92 causing perturbations or variations in the magnetic field. After teeth 66 are sensed by probe 92, a rotational speed of seal plate 62 (and by extension low speed shaft 46) is determined. The speed of low speed shaft 46 (or of any other shafts in gas turbine engine 10) is used for at least one of the following: to provide a read-out in the cockpit to reflect revolutions per minute of gas turbine engine 10; to provide a control action to adjust the speed of low speed shaft 46; to provide an input into a control computer of gas turbine engine 10 (such as a full authority digital engine control ("FADEC")); to determine an amount of fuel to dump into gas turbine engine 10; to determine an adjustment of a fuel schedule or a vane schedule; or to relate the speed of low speed shaft 46 to a health monitoring system of gas turbine engine 10.

Body 94 houses electrical and magnetic components of probe 92. Threaded portion 96 is configured to threadably engage with threaded portion 90 of slot 88. Magnet 98 is configured to produce a magnetic field. Coil 100 is configured to have an electric current induced in coil 100 in response to changes in the magnetic field of magnet 98. Tip 102 senses variations in the magnetic field caused by teeth 66 as seal plate 62 rotates about axis 12 and moves relative to tip 102 of probe 92. Seal plate 62 provides a sealing interface between seal plate 62 and seal element 114. Seal plate 62 creates a wet face seal at an axially downstream end (to the right in FIG. 3) by channeling oil from annulus 76, through channel 70, to axial outlet 106, and to the axially downstream end of seal plate 62 at an interface between seal plate 62 and seal element 114. Teeth 66 function by passing across or by tip 102 of probe 92 thereby perturbing or altering the magnetic field of the magnet in body 94 of probe 92. As teeth 66 perturb the magnetic field of the magnet in body 94, a current is induced in the coil of body 94. The current induced in the coil of body 94 is then received by electrical circuitry connected to probe 92 that processes the induced current to produce an electrical signal that indicates the rotational speed of shaft 46.

Channel 70 provides a passage for oil to pass from annulus 76, through a portion of seal plate 62, and to sealing interface 116 at the axial end of seal plate 62. The oil transferred through channel 70 (or channels 70) provides thermal regulation (e.g., cooling) of seal plate 62 as well as provides a lubricating film at sealing interface 116 for seal plate 62 to ride against as seal plate 62 rotates relative to seal element 114. Scoop 74 catches and/or traps in annulus 76 oil flung off of low speed shaft 46 due to a centrifugal force of the oil as low speed shaft 46 rotates. Scoop 74 prevents the oil from being sprayed throughout bearing compartment 50B. The combination of scoop 74, channel 70, and channel 108 provide a cooling function to seal plate 62 so that seal plate 62 does not overheat. Annulus 76 contains oil captured or trapped by scoop 74 as oil is flung off of low speed shaft 46.

Retaining element 110 functions to press, or compress, seal plate 62 in an axial direction (to the left in FIG. 3) against shoulder 80 of low speed shaft 46 so as to prevent relative rotation and axial displacement between seal plate 62 and low speed shaft 46. Retaining element 110 functions to engage with threaded portion 82 of low speed shaft 46 so as to attach retaining element 110 to low speed shaft 46 as well as retain seal plate 62 on low speed shaft 46. Threaded portion 112 is configured to threadably engage with threaded portion 82 of low speed shaft 46. Seal element 114 is configured to form sealing interface 116 at a point at which seal plate 62 and seal element 114 come into contact. Sealing interface 116 is configured to provide a lubricating film and a fluidic seal between seal plate 62 and seal element 114.

Previous designs of seal assemblies included stand-alone pieces with teeth which increased the part count and weight within the engine compartment. As opposed to existing designs, the purpose of seal assembly 78 with seal plate 62 is to provide teeth 66 on a component already within the engine compartment removing the need for a stand-alone toothed piece in addition to seal plate 62. Seal plate 62 with teeth 66 allows for several functions required for oil sealed rotating hardware to be combined into a single, space efficient part. A sealing surface is created, lubricating oil is pumped to that sealing surface, and the speed of the engine shaft (e.g., low speed shaft 46 in this non-limiting embodiment) is measured all with a single part providing for space, weight, and part count savings.

Discussion of Possible Embodiments

The following are non-exclusive descriptions of possible embodiments of the present invention.

A sealing assembly for a bearing compartment of a gas turbine engine includes a shaft and a seal plate mounted to the shaft. The shaft is configured to rotate about a longitudinal axis of the gas turbine engine. The seal plate includes an annular body, a scoop, a sealing surface, a plurality of teeth, and a channel. The scoop is connected to and extends radially from the annular body. The scoop defines a lip and an annulus surrounding the shaft and is disposed on a first axial end of the annular body. The sealing surface is disposed on a second axial end of the annular body opposite from the scoop. The plurality of teeth are disposed into and along an outer perimeter of a portion of the annular body. The channel extends through a portion of the annular body and is fluidly connected to the scoop and to the sealing surface.

The sealing assembly of the preceding paragraph can optionally include, additionally and/or alternatively, any one or more of the following features, configurations and/or additional components.

The seal plate can comprise a wet seal configured to form a sealing interface using a fluid.

The seal plate can comprise a face seal with the sealing surface oriented orthogonally to a rotational axis of the seal plate.

The seal plate can comprise a rotating seal that can be configured to form a sealing interface while rotating.

A sensor can be disposed radially outward from the seal plate, wherein the sensor can be configured to detect a rotational velocity of the seal plate.

The sensor can comprise a probe configured to create a magnetic field and/or sense changes in the magnetic field as the plurality of teeth of the seal plate passes by the probe.

A tip can be configured to sense movement of the tooth.

The sensor can be mounted to a cross-over housing of the gas turbine engine.

A material of the seal plate can comprise a ferromagnetic metal.

The material of the seal plate can comprise steel.

A method of measuring a rate of rotation of a seal plate in a gas turbine engine includes rotating the seal plate. The seal plate includes an annular body, a scoop, a sealing surface, a plurality of teeth, and a channel. The scoop is connected to and extends radially from the annular body. The scoop defines a lip and an annulus and is disposed on a first axial end of the annular body. The sealing surface is disposed on a second axial end of the annular body opposite from the scoop. The plurality of teeth are disposed into and along an outer perimeter of a portion of the annular body. The channel extends through a portion of the annular body and is fluidly connected to the scoop and to the sealing surface. A rate of rotation of the seal plate is sensed with a sensor, with the sensor being mounted to a housing of the gas turbine engine.

The method of the preceding paragraph can optionally include, additionally and/or alternatively, any one or more of the following steps, features, configurations and/or additional components.

Oil can be caught with a scoop of the seal plate, wherein the scoop can be disposed on a first axial end of the seal plate.

Oil can be drawn through the channel from the scoop to the sealing surface.

A wet sealing interface can be formed at the sealing surface with the oil drawn through the channel from the scoop.

A change in a magnetic field of the sensor caused by the plurality of teeth of the rotating seal plate can be sensed.

The seal plate can be rotated relative to the sensor.

A seal plate includes an annular body, a scoop, a sealing surface, a plurality of teeth, and a channel fluidly connected to the scoop and to the sealing surface. The scoop is connected to and extending radially from the annular body. The scoop defines a curved lip and an annulus and is disposed on a first axial end of the annular body. The sealing surface is disposed on a second axial end of the annular body opposite from the scoop. The plurality of teeth are disposed into and along an outer perimeter of a portion of the annular body. The plurality of teeth are configured to induce a current as the seal plate is rotated. The channel extends through a portion of the annular body and is fluidly connected to the scoop and to the sealing surface. The seal plate comprises a wet seal configured to form a sealing interface using a fluid. The seal plate comprises a face seal with the sealing surface oriented orthogonally to a rotational axis of the seal plate. A material of the seal plate comprises a ferromagnetic metal.

The sealing assembly of the preceding paragraph can optionally include, additionally and/or alternatively, any one or more of the following features, configurations and/or additional components.

The plurality of teeth can be configured to engage with a magnetic probe such that a current can be induced in the probe as the seal plate rotates.

The seal plate can comprise a rotating seal that can be configured to form a sealing interface while rotating.

The material of the seal plate can comprise steel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sealing assembly for a bearing compartment of a gas turbine engine, the sealing assembly comprising:
    a shaft configured to rotate about a longitudinal axis of the gas turbine engine; and
    a seal plate mounted to the shaft, wherein the seal plate comprises:
        an annular body;
        a scoop connected to and extending radially from the annular body, wherein the scoop defines an annulus surrounding the shaft, wherein the scoop is disposed on a first axial end of the annular body;
        a sealing surface disposed on a second axial end of the annular body opposite from the scoop;
        a plurality of teeth disposed into and along an outer perimeter of a portion of the annular body; and
        a channel extending through a portion of the annular body, wherein the channel is fluidly connected to the scoop and to the sealing surface.

2. The sealing assembly of claim 1, wherein the seal plate comprises a wet seal configured to form a sealing interface using a fluid.

3. The sealing assembly of claim 1, wherein the seal plate comprises a face seal with the sealing surface oriented orthogonally to a rotational axis of the seal plate.

4. The sealing assembly of claim 1, wherein the seal plate comprises a rotating seal configured to form a sealing interface while rotating.

5. The sealing assembly of claim 1, further comprising a sensor disposed radially outward from the seal plate, wherein the sensor is configured to detect a rotational velocity of the seal plate.

6. The sealing assembly of claim 5, wherein the sensor comprises a probe configured to create a magnetic field and sense changes in the magnetic field as the plurality of teeth of the seal plate rotates relative to the probe thereby perturbing the magnetic field of the probe.

7. The sealing assembly of claim 5, wherein the sensor comprises a tip configured to sense movement of the tooth.

8. The sealing assembly of claim 5, wherein the sensor is mounted to a cross-over housing of the gas turbine engine.

9. The sealing assembly of claim 1, wherein a material of the seal plate comprises a ferromagnetic metal.

10. A method of measuring a rate of rotation of a seal plate in a gas turbine engine, the method comprising:
    rotating the seal plate, wherein the seal plate comprises:
        an annular body;
        a scoop connected to and extending radially from the annular body, wherein the scoop defines an annulus, wherein the scoop is disposed on a first axial end of the annular body;
        a sealing surface disposed on a second axial end of the annular body opposite from the scoop;
        a plurality of teeth disposed into and along an outer perimeter of a portion of the annular body; and
        a channel extending through a portion of the annular body, wherein the channel is fluidly connected to the scoop and to the sealing surface; and
    sensing a rate of rotation of the seal plate with a sensor, wherein the sensor is mounted to a housing of the gas turbine engine.

11. The method of claim 10, further comprising catching oil with a scoop of the seal plate, wherein the scoop is disposed on a first axial end of the seal plate.

12. The method of claim 11, further comprising drawing oil through the channel from the scoop to the sealing surface.

13. The method of claim 12, further comprising forming a wet sealing interface at the sealing surface with the oil drawn through the channel from the scoop.

14. The method of claim 10, wherein sensing a rate of rotation of the seal plate further comprises sensing a change in a magnetic field of the sensor caused by the plurality of teeth of the rotating seal plate.

15. The method of claim 10, wherein rotating the seal plate further comprises rotating the seal plate relative to the sensor.

16. A seal plate comprising:
- an annular body;
- a scoop connected to and extending radially from the annular body, wherein the scoop defines an annulus, wherein the scoop is disposed on a first axial end of the annular body;
- a sealing surface disposed on a second axial end of the annular body opposite from the scoop;
- a plurality of teeth disposed into and along an outer perimeter of a portion of the annular body, wherein the plurality of teeth are configured to induce a current as the seal plate is rotated; and
- a channel extending through a portion of the annular body, wherein the channel is fluidly connected to the scoop and to the sealing surface, wherein the seal plate comprises a wet seal configured to form a sealing interface using a fluid, wherein the seal plate comprises a face seal with the sealing surface oriented orthogonally to a rotational axis of the seal plate, and wherein a material of the seal plate comprises a ferromagnetic metal.

17. The seal plate of claim 16, wherein the plurality of teeth are configured to engage with a magnetic probe such that a current is induced in the magnetic probe as the seal plate rotates.

18. The seal plate of claim 16, wherein the seal plate comprises a rotating seal configured to form the sealing interface while rotating.

* * * * *